United States Patent
Eom et al.

(10) Patent No.: US 7,746,284 B2
(45) Date of Patent: Jun. 29, 2010

(54) CROSS DIPOLE, CROSS DIPOLE MODULE, ARRAY ANTENNA, AND MULTIPLE INPUT MULTIPLE OUTPUT ANTENNA

(75) Inventors: Soon Young Eom, Daejeon (KR); Young Bae Jung, Daejeon (KR); Moon Man Hur, Seoul (KR); Soon Ik Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 12/117,460

(22) Filed: May 8, 2008

(65) Prior Publication Data

US 2009/0066601 A1   Mar. 12, 2009

(30) Foreign Application Priority Data

Sep. 10, 2007   (KR) .................. 10-2007-0091456

(51) Int. Cl.
    *H01Q 21/26*   (2006.01)
(52) U.S. Cl. ......................... 343/797; 343/799
(58) Field of Classification Search .............. 343/797, 343/798, 799
    See application file for complete search history.

(56) References Cited

U.S. PATENT DOCUMENTS

| | | | | |
|---|---|---|---|---|
| 2,432,858 A | * | 12/1947 | Brown | ................ 343/791 |
| 2,522,562 A | * | 9/1950 | Blitz | ................ 343/756 |
| 5,173,715 A | * | 12/1992 | Rodal et al. | ............. 343/795 |
| 6,072,439 A | * | 6/2000 | Ippolito et al. | ........... 343/797 |
| 6,211,840 B1 | * | 4/2001 | Wood et al. | .............. 343/793 |
| 6,339,407 B1 | * | 1/2002 | Gabriel et al. | ............ 343/797 |
| 6,342,867 B1 | * | 1/2002 | Bell | ........................ 343/795 |
| 6,741,220 B2 | | 5/2004 | Inoue et al. | |
| 2006/0079177 A1 | | 4/2006 | Okubora | |

FOREIGN PATENT DOCUMENTS

| JP | 2004-242277 | 8/2004 |
|---|---|---|
| KR | 20020005027 | 1/2002 |

OTHER PUBLICATIONS

Chung et al., "Reconfigurable Microstrip Patch Antenna With Switchable Polarization", ETRI Journal, vol. 28, No. 3, Jun. 2006, pp. 379-382.

* cited by examiner

*Primary Examiner*—Tho G Phan
(74) *Attorney, Agent, or Firm*—Rabin & Berdo, P.C.

(57) ABSTRACT

The present invention relates to a cross dipole including a plurality of dipole elements respectively corresponding to a plurality of frequency bands and reconfiguring the plurality of frequency bands. A cross dipole module includes a circuit for controlling a signal of the cross dipole according the cross dipole and an external control signal. An array antenna includes a plurality of cross dipole modules arranged in one dimension or two dimensions. A multiple input multiple output antenna includes a plurality of array antennas for independently operating and an indoor supporting system for respectively applying a control signal to the plurality of array antennas, and reconfigures a distance between the neighboring array antennas.

23 Claims, 7 Drawing Sheets

CROSS DIPOLE, CROSS DIPOLE MODULE, ARRAY ANTENNA, AND MULTIPLE INPUT MULTIPLE OUTPUT ANTENNA

CROSS-REFERENCE TO RELATED APPLICATION

This application claims priority to and the benefit of Korean Patent Application No. 10-2007-0091456 filed in the Korean Intellectual Property Office on Sep. 10, 2007, the entire contents of which are incorporated herein by reference.

BACKGROUND OF THE INVENTION (a) Field of the Invention

The present invention relates to a cross dipole, a cross dipole module, an array antenna, and a multiple input multiple output antenna.

This work was supported by the IT R&D program of MIC/IITA [2007-F-041-01, Intelligent Antenna Technology Development].

(b) Description of the Related Art

Needs for wireless communication services including wireless broadband (Wibro), world interoperability for microwave access (WiMAX), and wireless LAN (WLAN) have been increased. Since wideband is used for the wireless communication services, a multiple input multiple output (MIMO) method is combined to the wireless communication services to increase a data rate.

Generally, in a base station antenna for the wireless communication service, cross dipoles are arranged in one dimension or two dimensions, and a power combining circuit is used to combine power.

In addition, for the wireless communication service to which the MIMO method is used, it is required to independently drive a plurality of antennas to perform multiple input or multiple output. According to the MIMO method, as correlation between signals input or output through the plurality of antennas is decreased, the data rate increases. In this case, as a distance between the neighboring antennas increases, the correlation between the signals input or output through the antennas decreases. However, when the distance between the neighboring antennas is increased, the size of the antenna is problematically increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cross dipole, a cross dipole module, an array antenna, and a multiple input multiple output antenna, in which a distance between a plurality of antennas for independently operating may not be increased and a correlation between signals input or output through the plurality of antennas may be reduced.

According to an exemplary embodiment of the present invention, a cross dipole includes a first dipole element, first and second feed points, third and fourth feed points, a second dipole element, and a first switch. The first dipole element includes a first dipole arranged in a first direction and a second dipole arranged in a second direction crossing the first direction, and corresponds to a first frequency band. The first and second feed points apply a signal to the first dipole. The third and fourth feed points apply a signal to the second dipole. The second dipole element includes a third dipole arranged in the first direction and connected to the first and second feed points through the first dipole, and a fourth dipole arranged in the second direction and connected to the third and fourth feed points through the second dipole. The first switch is formed between the first dipole element and the second dipole element and selectively conducts by an external control signal. The second dipole element corresponds to a second frequency band that is lower than the first frequency band.

In this case, the cross dipole operates at the first frequency band by the first dipole element when the first switch is turned off, and the cross dipole operates at the second frequency band by the first dipole element and the second dipole element when the first switch is turned on. The first switch is respectively formed between the first dipole and the third dipole and between the second dipole and the fourth dipole.

The cross dipole further includes a third dipole element and a second switch. The third dipole element includes a fifth dipole arranged in the first direction and connected to the first and second feed points through the first dipole and the third dipole and a sixth dipole arranged in the second direction and connected to the third and fourth feed points through the second dipole and the fourth dipole. The second switch is formed between the second dipole element and the third dipole element and selectively conducts by the external control signal. The third dipole element corresponds to a third frequency band that is lower than the second frequency band.

In this case, the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on. The first switch is respectively formed between the first dipole and the third dipole and between the second dipole and the fourth dipole, and the second switch is respectively formed between the third dipole and the fifth dipole and between the fourth dipole and the sixth dipole.

Signals of opposite phases are applied to the first feed point and the second feed point, and signals of opposite phases are applied to the third feed point and the fourth feed point.

An excitation direction of the plurality of dipoles arranged in the first direction is determined according to phases of the signals applied to the first feed point and the second feed point, an excitation direction of the plurality of dipoles arranged in the second direction is determined according to the phase of the signals applied to the third feed point and the fourth feed point, and a polarization direction is determined by a vector addition of the excitation direction of the plurality of dipoles arranged in the first direction and the excitation direction of the plurality of dipoles arranged in the second direction.

According to a second exemplary embodiment of the present invention, a cross dipole module includes a cross dipole for reconfiguring a plurality of frequency bands according to an external control signal and generating polarization. Here, in the cross dipole module, the cross dipole includes a first dipole element, first and second feed points, third and fourth feed points, a second dipole element, and a first switch. The first dipole element includes a first dipole arranged in a first direction and a second dipole arranged in a second direction crossing the first direction, and corresponds to a first frequency band. The first and second feed points apply a signal to the first dipole. The third and fourth feed points apply a signal to the second dipole. The second dipole element includes a third dipole connected to the first and second feed points through the first dipole and a fourth dipole connected to the third and fourth feed points through the second dipole, and corresponds to a second frequency band that is lower than the first frequency band. The first switch is formed between the first dipole element and the second dipole element and selectively conducts by an external control signal.

In addition, the cross dipole further includes a third dipole element and a second switch. The third dipole element includes a fifth dipole connected to the first and second feed points through the first dipole and the third dipole and a sixth dipole connected to the third and fourth feed points through the second dipole and the fourth dipole, and corresponds to a third frequency band that is lower than the second frequency band. The second switch is formed between the second dipole element and the third dipole element and selectively conducts by the external control signal. In this case, the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on.

In addition, the cross dipole module further includes a first balun circuit, a second balun circuit, a phase shifter, a multiplexer, an amplifier, and a controller. The first balun circuit respectively applies signals of opposite phases to the first feed point and the second feed point. The second balun circuit respectively applies signals of opposite phases to the third feed point and the fourth feed point. The phase shifter respectively applies signals having a predetermined phase difference to the first balun circuit and the second balun circuit. The multiplexer is used in order to select a frequency band reconfigured according to the external control signal. The amplifier amplifies a signal to be input from/to the cross dipole. The controller controls the first and second balun circuits, the phase shifter, the multiplexer, and the amplifier according to the external control signal.

According to a third exemplary embodiment of the present invention, an array antenna includes a plurality of cross dipole modules respectively including a cross dipole for reconfiguring a plurality of frequency bands. Here, the cross dipole includes a first dipole element, first and second feed points, third and fourth feed points, a second dipole element, and a first switch. The first dipole element includes a first dipole arranged in a first direction and a second dipole arranged in a second direction crossing the first direction, and corresponds to a first frequency band. The first and second feed points apply a signal to the first dipole. The third and fourth feed points apply a signal to the second dipole. The second dipole element includes a third dipole connected to the first and second feed points through the first dipole and a fourth dipole connected to the third and fourth feed points through the second dipole, and corresponds to a second frequency band that is lower than the first frequency band. The first switch is formed between the first dipole element and the second dipole element and selectively conducts by an external control signal.

In addition, in the array antenna, the cross dipole includes a third dipole element and a second switch. The third dipole element includes a fifth dipole connected to the first and second feed points through the first dipole and the third dipole and a sixth dipole that is arranged in the second direction and is connected to the third and fourth feed points through the second dipole and the fourth dipole, and corresponds to a third frequency band that is lower than the second frequency band. The second switch is formed between the first dipole element and the second dipole element and selectively conducts by a frequency band at which the cross dipole operates. Here, the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on.

The array antenna further includes a feeder unit, a driver, and a controller. The feeder unit combines or separates signals input/output through the plurality of cross dipole modules. The driver readjusts a distance between the neighboring cross dipole modules according to a frequency band at which the plurality of cross dipole modules operate. The controller applies a signal for controlling input/output signals of the cross dipole and a DC power source to the plurality of cross dipole modules.

According to a fourth exemplary embodiment of the present invention, a multiple input multiple output antenna includes a plurality of array antennas and an indoor supporting system. The plurality of array antennas inputs/outputs a frequency band or signals having different polarization directions. The indoor supporting system generates a signal for controlling the plurality of array antennas. The array antenna includes a plurality of cross dipole modules that are simultaneously controlled. The cross dipole module includes a cross dipole for reconfiguring the plurality of frequency bands and reconfiguring the polarization direction. The cross dipole includes a first dipole element, first and second feed points, third and fourth feed points, a second dipole element, and a first switch. The first dipole element includes a first dipole arranged in a first direction and a second dipole arranged in a second direction crossing the first direction, and corresponds to a first frequency band. The first and second feed points apply a signal to the first dipole. The third and fourth feed points apply a signal to the second dipole. The second dipole element includes a third dipole connected to the first and second feed points through the first dipole and a fourth dipole connected to the third and fourth feed points through the second dipole, and corresponds to a second frequency band that is lower than the first frequency band. The first switch is formed between the first dipole element and the second dipole element and selectively conducts according to a frequency band at which the cross dipole operates.

In the multiple input multiple output antenna, the cross dipole includes a third dipole element and a second switch. The third dipole element includes a fifth dipole connected to the first and second feed points through the first dipole and the third dipole and a sixth dipole connected to the third and fourth feed points through the second dipole and the fourth dipole, and corresponds to a third frequency band that is lower than the second frequency band. The second switch is formed between the second dipole element and the third dipole element and selectively conducts according to a frequency band at which the cross dipole operates. In this case, the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on.

In addition, in the cross dipole in the multiple input multiple output antenna, an excitation direction of the plurality of dipoles arranged in the first direction is determined according to phases of the signals applied to the first feed point and the second feed point, an excitation direction of the plurality of dipoles arranged in the second direction is determined according to the phase of the signals applied to the third feed point and the fourth feed point, and a polarization direction is determined by a vector addition of the excitation direction of the plurality of dipoles arranged in the first direction and the excitation direction of the plurality of dipoles arranged in the second direction.

The indoor supporting system includes an operational signal processing block, an input/output signal processing block, a terminal distance control signal processing block, and a control signal processing block. The operational signal processing block physically reconfigures a distance between the neighboring cross dipole modules according to the frequency band reconfigured by the plurality of cross dipole modules formed in the array antenna. The input/output signal processing block processes signals input/output through the plurality of array antennas. The terminal distance control signal processing block readjusts a distance between the neighboring array antennas according to a frequency band of the signal input/output through each array antenna in the plurality of array antennas. The control signal processing block applies a control signal for reconfiguring the frequency band of the signal to be input/output through the plurality of array antennas and designates a type of signal to be generated by the plurality of array antennas and a DC power source required in the plurality of array antennas to the array antenna.

In this case, in the multiple input multiple output antenna, the array antenna includes a feeder unit, a driver, and a controller. The feeder unit combines signals generated by controlling the plurality of cross dipole modules to apply the combined signal to the input/output signal processing block or separates the signal applied from the input/output signal processing block to be respectively applied to the plurality of cross dipole modules. The driver readjusts a distance between the neighboring cross dipole modules according to the control signal applied from the operational signal processing block. The controller equally applies the control signal and the DC power source that are applied from the control signal processing block to the plurality of cross dipole modules.

In addition, in the multiple input multiple output antenna, the cross dipole module includes a first balun circuit, a second balun circuit, a phase shifter, a multiplexer, and an amplifier. The first balun circuit respectively applies signals of opposite phases to the first feed point and the second feed point. The second balun circuit respectively applies signals of opposite phases to the third feed point and the fourth feed point. The phase shifter respectively applies an input current having a predetermined phase difference to the first balun circuit and the second balun circuit according to the control signal applied from the control signal processing block. The multiplexer is used in order to select a frequency band reconfigured according to the control signal applied from the control signal processing block. The amplifier amplifies the input/output signals of the cross dipole.

According to the exemplary embodiments of the present invention, the cross dipole, the cross dipole module, and the array antenna may reconfigure a frequency band of an input/output signal and a polarization direction. In addition, the multiple input multiple output antenna according to the exemplary embodiment of the present invention may independently operate the plurality of array antennas, and therefore a multiple input multiple output function may be performed. Further, since the multiple input multiple output antenna may readjust a distance between the neighboring array antennas, the distance may not be increased, and a correlation between signals input or output through the plurality of antennas may be reduced.

DETAILED DESCRIPTION OF THE EMBODIMENTS

Figure 1:
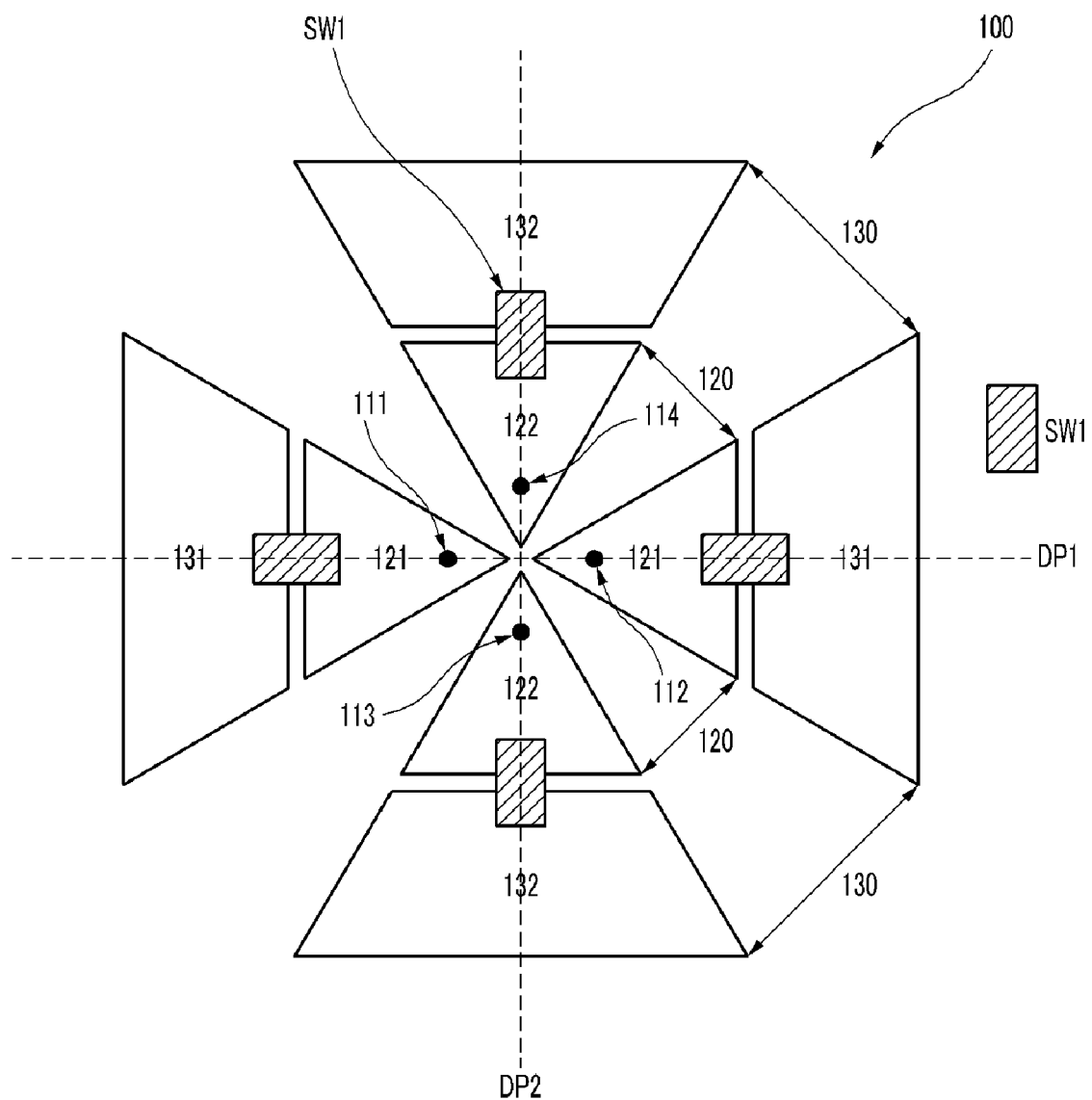
FIG. 1 is a diagram of a configuration of a cross dipole for reconfiguring two frequency bands according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements. The terms "unit", "module", and "block" used herein mean one unit that processes a specific function or operation, and may be implemented by hardware, software, or a combination thereof.

A cross dipole, a cross dipole module, an array antenna, and a multiple input multiple output antenna according to the exemplary embodiment of the present invention will now be described with reference to the figures.

The cross dipole according to the exemplary embodiment of the present invention includes a basic dipole element directly connected to a feed point to which a signal is applied and a plurality of parasitic dipole elements indirectly connected to the feed point through a switch. The basic dipole element and the parasitic dipole elements respectively include dipoles arranged in a first direction and dipoles arranged in a second direction crossing the first direction. In addition, the basic dipole element and the plurality of parasitic dipole elements (hereinafter, referent as "all dipole elements") respectively correspond to different frequency bands. Since the cross dipole according to the exemplary embodiment of the present invention uses a switch to select a dipole element, a plurality of frequency bands are reconfigured. When the plurality of frequency bands are reconfigured, the cross dipole operates within one frequency band selected from the plurality of frequency bands.

FIG. 1 is a diagram of a configuration of the cross dipole for reconfiguring two frequency bands according to the exemplary embodiment of the present invention.

As shown in FIG. 1, a cross dipole 100 includes feed points 111, 112, 113, and 114, basic dipole elements 121 and 122, first parasitic dipole elements 131 and 132, and a switch SW1. The cross dipole 100 shown in FIG. 1 uses the basic dipole elements 121 and 122 to operate within a first frequency band or uses the basic dipole elements 121 and 122 and the first parasitic dipole elements 131 and 132 to operate within a second frequency band that is lower than the first frequency band.

The feed points 111, 112, 113, and 114 apply signals to the cross dipole 100. The feed points 111 and 112 apply a signal to a dipole of a first direction DP1 shown in FIG. 1, and the feed points 113 and 114 apply a signal to a dipole of a second direction DP2 shown in FIG. 1. A direction of polarization generated from the cross dipole 100 is determined according to phases of the signals applied to the feed points 111, 112, 113, and 114.

The basic dipole elements 121 and 122 include the dipole 121 of the first direction DP1 and the dipole 122 of the second direction DP2 that are directly connected to the feed points 111, 112, 113, and 114.

The first parasitic dipole elements 131 and 132 includes the dipole 132 of the first direction DP1 and the dipole 132 of the second direction DP2 that are connected to the feed points 111, 112, 113, and 114 while having switches SW1 between the first parasitic dipole elements 131 and 132 and the feed points 111, 112, 113, and 114.

The switch SW1 determines a selected state of the first parasitic dipole elements 131 and 132. That is, when the switch SW1 is turned off, the cross dipole 100 operates within the first frequency band by the basic dipole elements 121 and 122. In addition, when the switch SW1 is turned on, the cross dipole operates within the second frequency band by the basic dipole elements 121 and 122 and the first parasitic dipole elements 131 and 132.

Since the second frequency band is lower than the first frequency band, a wavelength corresponding to the second frequency band is longer than a wavelength corresponding to the first frequency band. Therefore, an electric length of each dipole corresponding to the second frequency band is longer than an electric length of each dipole corresponding to the first frequency band. Since the electric length of the dipole varies according to the frequency band, a distance between the dipoles is required to be increased as the frequency band is decreased.

According to the exemplary embodiment of the present invention, the cross dipole 100 operates within the first frequency band when the basic dipole elements 121 and 122 that are arranged to be close to a crossing point of the first direction DP1 and the second direction DP2 are selected. In addition, the first parasitic dipole elements 131 and 132 are arranged to be apart from the crossing point of the first direction DP1 and the second direction DP2, and a distance 130 between the dipoles 131 and 132 is longer than a distance 120 between the dipoles 121 and 122. Therefore, since the first parasitic dipole elements 131 and 132 are additionally selected, the cross dipole 100 operates within the second frequency band that is lower than the first frequency band by the basic dipole elements 121 and 122 and the first parasitic dipole elements 131 and 132.

The cross dipole 100 operates within the first frequency band by the basic dipole elements 121 and 122 that are arranged to be close to the crossing point of the first direction DP1 and the second direction DP2. In addition, when the first parasitic dipole elements 131 and 132 that are arranged to be apart from the crossing point of the first direction DP1 and the second direction DP2 are additionally selected, the cross dipole 100 operates within the second frequency band that is lower than the first frequency band.

The cross dipole 100 according to the exemplary embodiment of the present invention reconfigures two frequency bands according to a selected state of the parasitic dipole elements.

In addition, while the cross dipole 100 including one parasitic dipole element to reconfigure two frequency bands is shown in FIG. 1, the cross dipole according to the exemplary embodiment of the present invention may include a plurality of parasitic dipole elements to reconfigure a plurality of frequency bands.

Figure 2:
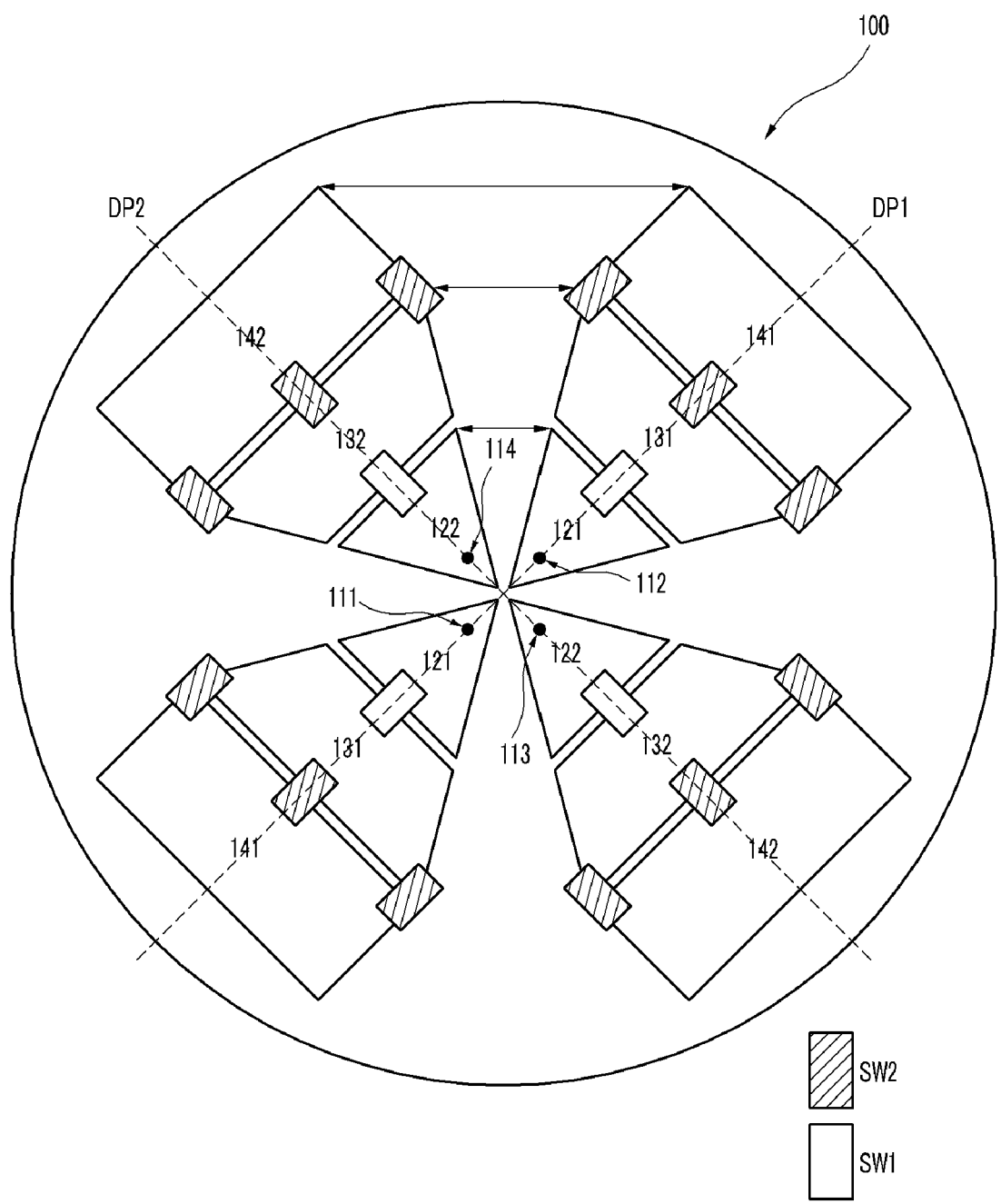
FIG. 2 is a configuration of a cross dipole for reconfiguring three frequency bands according to the exemplary embodiment of the present invention.

FIG. 2 is a configuration of a cross dipole for reconfiguring three frequency bands according to the exemplary embodiment of the present invention.

The cross dipole 100 shown in FIG. 2 is the same as the cross dipole shown in FIG. 1 except that the cross dipole 100 shown in FIG. 2 operates within a third frequency band that is lower than the second frequency band by using the basic dipole elements 121 and 122, the first parasitic dipole elements 131 and 132, and second parasitic dipole elements 141 and 142.

As shown in FIG. 2, the cross dipole 100 includes feed points 111, 112, 113, and 114, the basic dipole elements 121 and 122, the first parasitic dipole elements 131 and 132, the second parasitic dipole elements 141 and 142, and switches SW1 and SW2.

Here, the feed points 111, 112, 113, and 114, the basic dipole elements 121 and 122, the first parasitic dipole elements 131 and 132, and the switch SW1 are the same as those shown in FIG. 1, and descriptions of parts having been described will be omitted.

The second parasitic dipole elements 141 and 142 include the dipole 141 of the first direction DP1 and the dipole 142 of the second direction DP2 that are connected to the feed points 111, 112, 113, and 114 through the switches SW1 and SW2. In addition, the second parasitic dipole elements 141 and 142 are arranged to be apart from the crossing point of the first direction DP1 and the second direction DP2 to be further than the first parasitic dipole elements 131 and 132, and a distance 140 between the dipole 141 and dipole 142 is longer than the distance 130 between the dipole 131 and the dipole 132. Therefore, when the second parasitic dipole elements 141 and 142 are additionally selected, the cross dipole 100 operates within the third frequency band that is lower than the second frequency band.

The switch SW2 determines a selected state of the second parasitic dipole elements 141 and 142. That is, the second parasitic dipole elements 141 and 142 are not selected when the switch SW2 is turned off, the second parasitic dipole elements 141 and 142 are selected when the switch SW2 is turned on, and the cross dipole 100 operates at a frequency band corresponding to the second parasitic dipole elements 141 and 142.

That is, since the first parasitic dipole elements 131 and 132 and the second parasitic dipole elements 141 and 142 are not selected when the switch SW1 and the switch SW2 are turned off, the cross dipole 100 operates within the first frequency band by the basic dipole elements 121 and 122. Since the first parasitic dipole elements 131 and 132 are additionally selected when the switch SW1 is turned on and the switch SW2 is turned off, the cross dipole 100 operates within the second frequency band by the basic dipole elements 121 and 122 and the first parasitic dipole elements 131 and 132. Since the first parasitic dipole elements 131 and 132 and the second parasitic dipole elements 141 and 142 are selected when the switch SW1 and the switch SW2 are turned on, the cross dipole 100 operates within the third frequency band by the basic dipole elements 121 and 122, the first parasitic dipole elements 131 and 132, and the second parasitic dipole elements 141 and 142.

In FIG. 1 and FIG. 2, while one switch SW1 is respectively formed between the basic dipole elements and the first parasitic dipole elements, and three switches SW2 are respectively formed between the first parasitic dipole elements and the second parasitic dipole elements, these are only examples, and the number of switches SW1 or switches SW2 is determined so that the cross dipole 100 stably operates and the size of the cross dipole 100 is minimized.

In FIG. 1 and FIG. 2, the first frequency band, the second frequency band, and the third frequency band may be respectively a frequency band for a wireless communication service, or a frequency band for a wireless telephone service. For example, the first frequency band may be set to be within a range of 2.4 GHz to 2.5 GHz for world interoperability for microwave access (WiMAX) service, the second frequency band may be set to be within a range of 1.8 GHz to 2.3 GHz for a personal communication service (PCS) service, a wideband-code division multiple access (W-CDMA) service, a wireless broadband Internet (Wibro) service, or a wireless LAN (WLAN) service, and the third frequency band may be set to be 800 MHz for a cellular phone service.

In the cross dipole 100 according to the exemplary embodiment of the present invention, the dipole of the first direction DP1 and the dipole of the second direction DP2 are excited by the signals respectively applied to the feed points 111, 112, 113, and 114 to generate polarization. In this case, a direction of the polarization is determined according to phases respectively applied to the feed points 111, 112, 113, and 114. In addition, the signal applied to the feed point 111 has an opposite phase to the signal applied to the feed point 112, and the signal applied to the feed point 113 has an opposite phase to the signal applied to the feed point 114.

Figure 3:
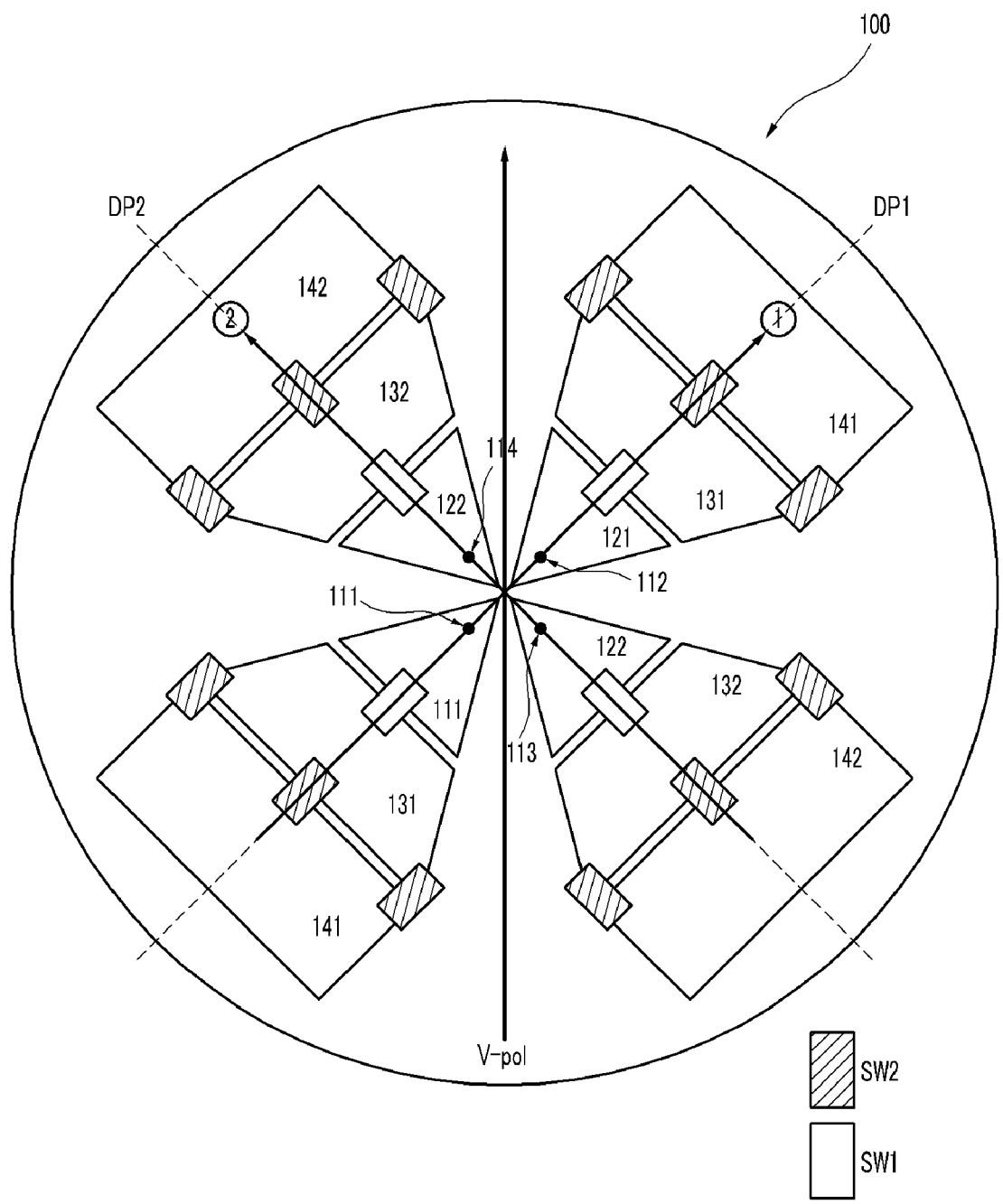
FIG. 3 is a diagram representing vertical polarization generated in the cross dipole according to the exemplary embodiment of the present invention.
Figure 4:
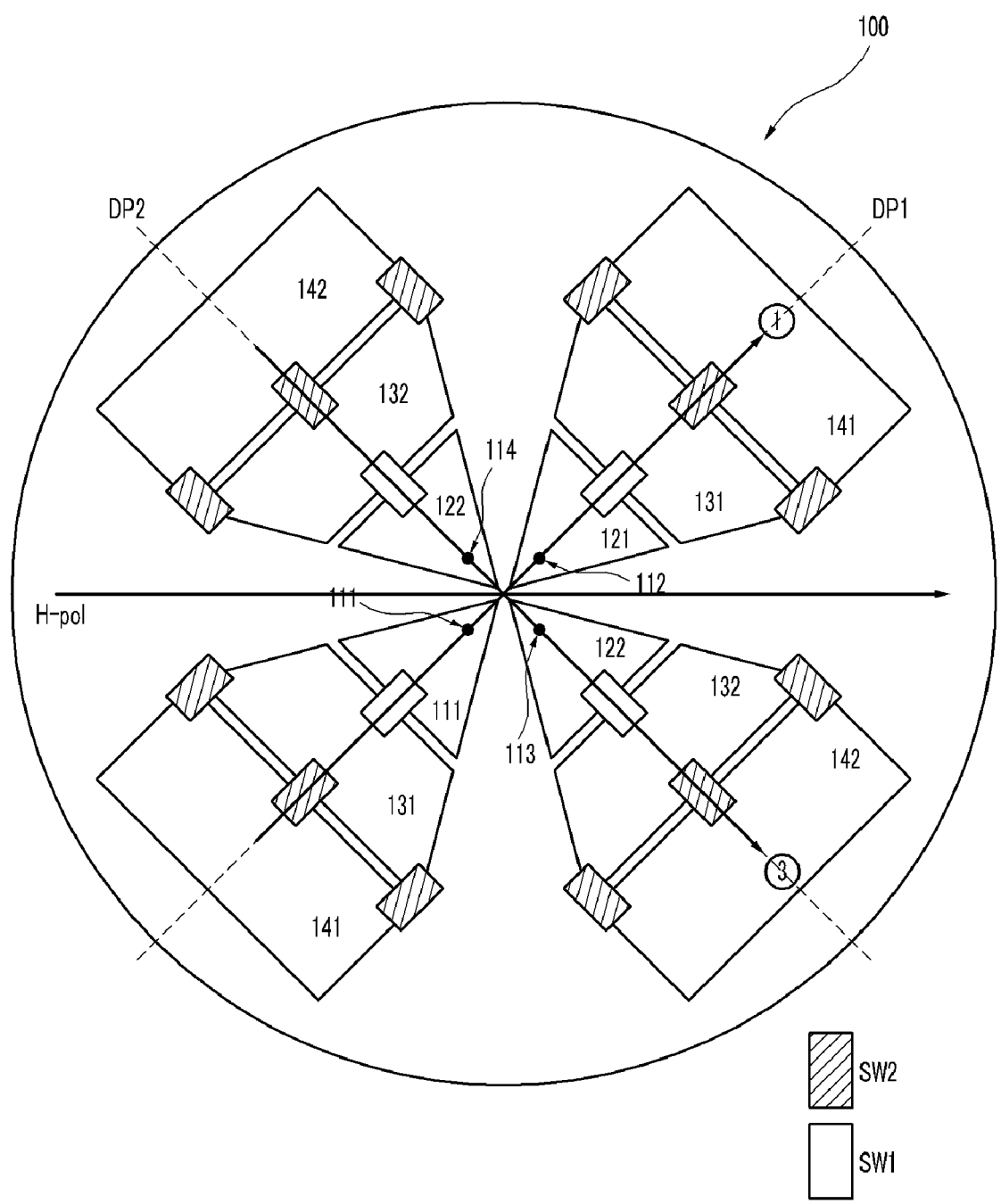
FIG. 4 is a diagram representing horizontal polarization generated in the cross dipole according to the exemplary embodiment of the present invention.

FIG. 3 is a diagram representing vertical polarization generated in the cross dipole according to the exemplary embodiment of the present invention, and FIG. 4 is a diagram representing horizontal polarization generated in the cross dipole according to the exemplary embodiment of the present invention. A description of operation of switches SW1 and SW2 will be omitted.

Table 1 shows polarization directions of the cross dipole 100 according to the phases of the signals respectively applied to the feed points 111, 112, 113, and 114.

TABLE 1

| Feed point | Vertical polarization (V-pol) | Horizontal polarization (H-pol) | Right direction polarization | Left direction polarization |
|---|---|---|---|---|
| (111, 112) | (0°, 180°) | (0°, 180°) | (0°, 180°) | (−90°, 90°) |
| (113, 114) | (0°, 180°) | (180°, 0°) | (−90°, 90°) | (0°, 180°) |

As shown in Table 1, to generate polarization having a direction that is vertical with respect to the horizontal plane (here, in FIG. 3, the polarization is denoted by V-pol and is referred to as "vertical polarization") in the cross dipole 100, signals having a phase of 0° and a phase of 180° are respectively applied to the feed point 111 and the feed point 112, and signals having a phase of 0° and a phase of 180° are respectively applied to the feed point 113 and the feed point 114. Accordingly, as shown in FIG. 3, the dipole of the first direction DP1 is excited in an upward direction (①) in FIG. 3), and the dipole of the second direction DP2 is excited in an upward direction (②) in FIG. 3). The vertical polarization V-pol is generated from vector addition of a direction (①) excited from the dipole of the first direction DP1 and a direction (②) excited from the dipole of the second direction DP2 in the cross dipole 100.

In addition, as shown in Table 1, to generate polarization having a direction that is parallel with the horizontal plane (here, in FIG. 4, the polarization is denoted by H-pol, and is referred to as "horizontal polarization"), the signals having the phases of 0° and 180° are respectively applied to the feed point 111 and the feed point 112, and the signals having the phases of 180° and 0° are respectively applied to the feed point 113 and the feed point 114. Therefore, as shown in FIG. 4, the dipole of the first direction DP1 is excited in an upward direction (①), and the dipole of the second direction DP2 is excited in a downward direction (③) in FIG. 4). The horizontal polarization H-pol is generated from a vector addition of the direction (①) excited from the dipole of the first direction DP1 and a direction (③) excited from the dipole of the second direction DP2 in the cross dipole 100.

Further, as shown in Table 1, when signals having phases of 0° and 180° are respectively applied to the feed point 111 and the feed point 112 and signals having phases of −90° and 90° are respectively applied to the feed point 113 and the feed point 114, right direction polarization is generated in the cross dipole 100, which is not shown in the figures. Likewise, when signals having phases of −90° and 90° are respectively applied to the feed point 111 and the feed point 112 and signals having the phases of 0° and 180° are respectively applied to the feed point 113 and the feed point 114, right direction polarization is generated in the cross dipole 100.

As described, the cross dipole 100 according to the exemplary embodiment of the present invention may determine the direction of the polarization according to a phase difference between the signals respectively applied to the feed points 111, 112, 113, and 114.

As shown in FIG. 1 to FIG. 4, the cross dipole according to the exemplary embodiment of the present invention includes the plurality of parasitic dipole elements that may be selected by the switch, so that the plurality of frequency bands may be reconfigured by an electrical switching operation. In addition, the direction of the polarization generated in the cross dipole 100 is determined by the phase difference of the signals applied to the respective feed points.

A cross dipole module including the cross dipole 100 according to the exemplary embodiment of the present invention and a circuit for controlling signal input and signal output of the cross dipole 100 will now be described.

Figure 5:
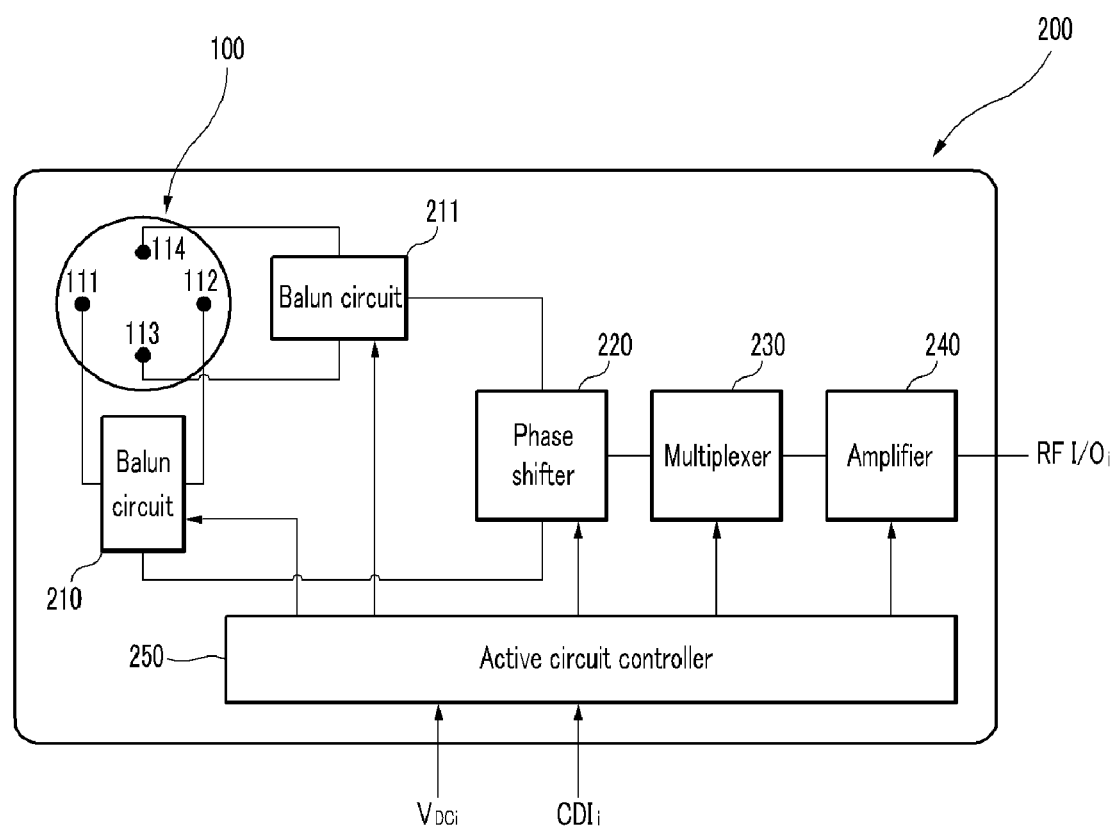
FIG. 5 is a diagram of a configuration of a cross dipole module according to the exemplary embodiment of the present invention.

FIG. 5 is a diagram of a configuration of the cross dipole module according to the exemplary embodiment of the present invention.

As shown in FIG. 5, a cross dipole module 200 according to the exemplary embodiment of the present invention includes the cross dipole 100 including the feed points 111, 112, 113, and 114, balun circuits 210 and 211, a phase shifter 220, a multiplexer 230, an amplifier 240, and an active circuit controller 250.

The cross dipole 100 includes the basic dipole elements and the plurality of parasitic dipole elements respectively including the dipoles of the first direction and the dipoles of the second direction, the feed points 111, 112, 113, and 114 for respectively applying signals to the dipoles of the first and second directions, and at least one switch for additionally selecting a parasitic dipole element to reconfigure the plurality of frequency bands. The cross dipole 100 is the same as that described in FIG. 1 to FIG. 4, and therefore descriptions of parts having been described will be omitted.

The balun circuits 210 and 211 respectively receive a signal from the phase shifter 220 and output a signal of an opposite phase to that of the received signal. That is, the balun circuit 210 applies a signal of an opposite phase to the feed point 111 and the feed point 112, and the balun circuit 211 applies a signal of an opposite phase to the feed point 113 and the feed point 114. In addition, the balun circuit 210 includes a reconfiguration matching circuit for providing a reconfiguration impedance matching function according to the balun circuit and a reconfigured frequency to a cross dipole element.

The phase shifter 220 includes phase bits of 0°, 90°, and 180°, and applies a signal of a predetermined phase difference determined according to a polarization direction to be generated by the cross dipole to the balun circuit 210 and the balun circuit 211. As shown in Table 1, since a signal of a phase of 0° is respectively applied to the balun circuit 210 and the balun circuit 211 so that the signal of the phase of 0° may be applied to the feed point 111 and the feed point 113, the vertical polarization V-pol is generated in the cross dipole 100. In addition, since the signal of the phase of 0° is applied to the balun circuit 210 and a signal of a phase of 180° is applied to the balun circuit 211 so that the signal of the phase of 0° may be applied to the feed point 111 and the feed point 114, the horizontal polarization H-pol is generated in the cross dipole 100.

The multiplexer 230 is used to select a reconfiguration band signal selected by the cross dipole module 200, and it includes a plurality of filters. In addition, a function of the multiplexer 230 varies according to a transmission or reception application of the cross dipole module 200. That is, since a signal of a transmission channel may affect a noise characteristic of a reception channel when the transmission band is used, the multiplexer 230 provides a low loss filtering function of a transmission signal band and a suppressing function of a received signal band. To prevent a reception channel from being saturated by the transmission channel signal when the reception band is used, the multiplexer 230 provides a low loss filtering function of a received signal band and a suppressing function of a transmission signal band.

The amplifier 240 is used to amplify a weak signal received from the cross dipole 10 with low noise or to amplify the signal with high power before transmitting the signal from the cross dipole 100 to a free space. That is, the amplifier 240 amplifies a transmission signal with the high power when the cross dipole module 200 is used for the transmission channel, and the amplifier 240 amplifies the received signal with the low noise when the cross dipole module 200 is used for the received channel. In FIG. 5, RF I/Oi connected to the amplifier 240 denotes a radio frequency (RF) signal input/output to/from an i-th cross dipole module.

The active circuit controller 250 receives a control signal $CDI_i$ and a DC power source $V_{DCi}$ that are externally applied to control signals of the cross dipole 100, and applies control signals and a DC voltage to the balun circuits 210 and 211, the phase shifter 220, the multiplexer 230, and the amplifier 240 according to the control signal $CDI_i$. That is, the active circuit controller 250 controls the balun circuits 210 and 211 and the phase shifter 220 according to the external control signal for the polarization direction of the cross dipole, and controls the multiplexer 230 and the amplifier 240 according to the external signal for the frequency band at which the cross dipole operates.

The cross dipole module 200 is included in an array antenna according to the exemplary embodiment of the present invention as a unit array element. In this case, the array antenna arranges a plurality of unit array elements including the cross dipole or the cross dipole module in one dimension or two dimensions, and improves a gain by spatially combining polarization signals equally generated from the unit array elements that are simultaneously driven.

The array antenna according to the exemplary embodiment of the present invention will now be described.

Figure 6:
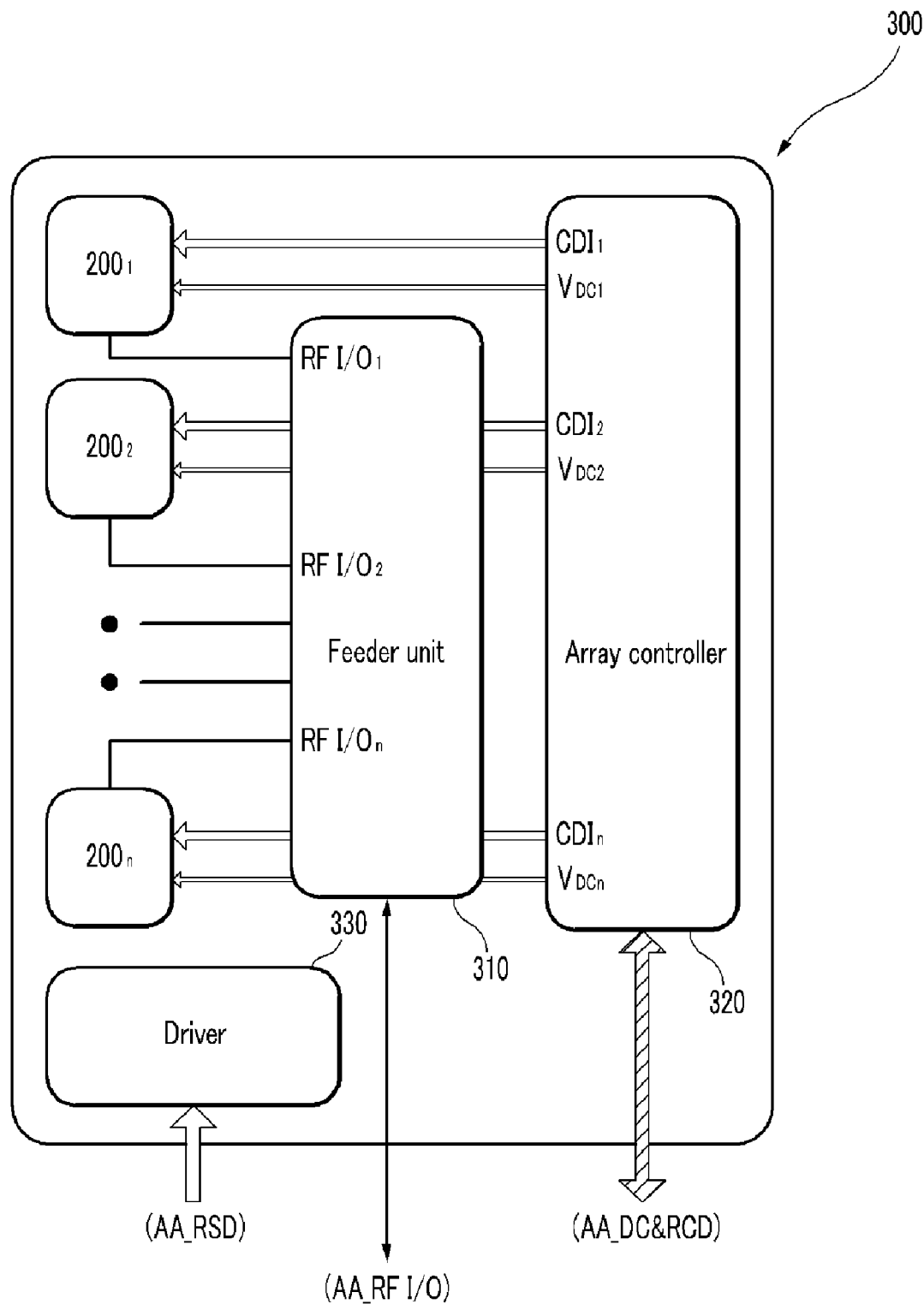
FIG. 6 is a diagram of a configuration of an array antenna according to the exemplary embodiment of the present invention.

FIG. 6 is a diagram of a configuration of the array antenna according to the exemplary embodiment of the present invention.

As shown in FIG. 6, the array antenna 300 includes n cross dipole modules $200_1$, $200_2$, ..., $200_n$, a feeder unit 310, an array controller 320, and a driver 330.

The n cross dipole modules $200_1$, $200_2$, ..., $200_n$ reconfigure the frequency band of the signal to be transmitted/received according to the external control signal, and reconfigure a beam direction. Here, n denotes a natural number that is greater than 1. The n cross dipole modules $200_1$, $200_2$, ..., $200_n$ may be regularly arranged (e.g., one vertical column or two vertical columns). The respective cross dipole modules $200_1$, $200_2$, ..., $200_n$ are the same as described in FIG. 5, and therefore descriptions of parts having been described will be omitted.

The feeder unit 310 includes RF input/output terminals RF I/O$_1$, RF I/O$_2$, ... RF I/O$_n$ (hereinafter referred to as "RF I/O terminals") respectively connected to the n cross dipole modules $200_1$, $200_2$, ..., $200_n$, and an array antenna RF input/output terminal AA_RF I/O (hereinafter referred to as an "AA_RF I/O terminal") connected to the outside. Here, when the array antenna 300 is used for the transmission channel, the feeder unit 310 respectively applies a signal input through the AA_RF I/O terminal to the n cross dipole modules $200_1$, $200_2$, ..., $200_n$ through the RF I/O$_n$ terminals. In addition, when the array antenna 300 is used for the reception channel, the feeder unit 310 receives the signals generated from the n cross dipole modules $200_1$, $200_2$, ..., $200_n$ through the RF I/O terminal, and combines the received signals to be externally output through the AA_RF I/O terminal. Here, the feeder unit 310 may perform a reconfiguration feed network function according to the reconfigured frequency band.

The array controller 320 receives a DC power and a reconfiguration control signal AA_DC&RCD (hereinafter referred to as an "AA_DC&RCD signal"), and applies control signals $CDI_1$, $CDI_2$, ..., $CDI_n$ and DC power sources $V_{DC1}$, $V_{DC2}$, ..., $V_{DCn}$ to the n cross dipole modules $200_1$, $200_2$, ..., $200_n$.

The driver 330 receives a control signal AA_RSD for reconfiguring distances between the cross dipole modules $200_1, 200_2, \ldots, 200_n$ neighboring the outside, and physically reconfigures the distances between the neighboring cross dipole modules $200_1, 200_2, \ldots, 200_n$. Correlations between respective input/output signals of the neighboring cross dipole modules $200_1, 200_2, \ldots, 200_n$ may be reduced according to the reconfigured frequency band.

As described, the array antenna 300 according to the exemplary embodiment of the present invention may reconfigure the plurality of frequency bands and the polarization direction with respect to the respective unit array elements according to the control signal. Since the distance between the neighboring unit array elements may be physically reconfigured, the correlation between the signals may be reduced according to the reconfigured frequency band.

In addition, to increase a data rate, a multiple input multiple output (MIMO) communication method is used in the wireless communication service. The wireless communication antenna using the MIMO communication method is required to include a plurality of input terminals and a plurality of output terminals.

According to the exemplary embodiment of the present invention, the MIMO antenna includes a plurality of array antenna for reconfiguring the plurality of frequency bands and reconfiguring the polarization direction in real-time and an indoor supporting system for controlling the plurality of array antennas and reconfiguring the distance between the neighboring array antennas.

Figure 7:
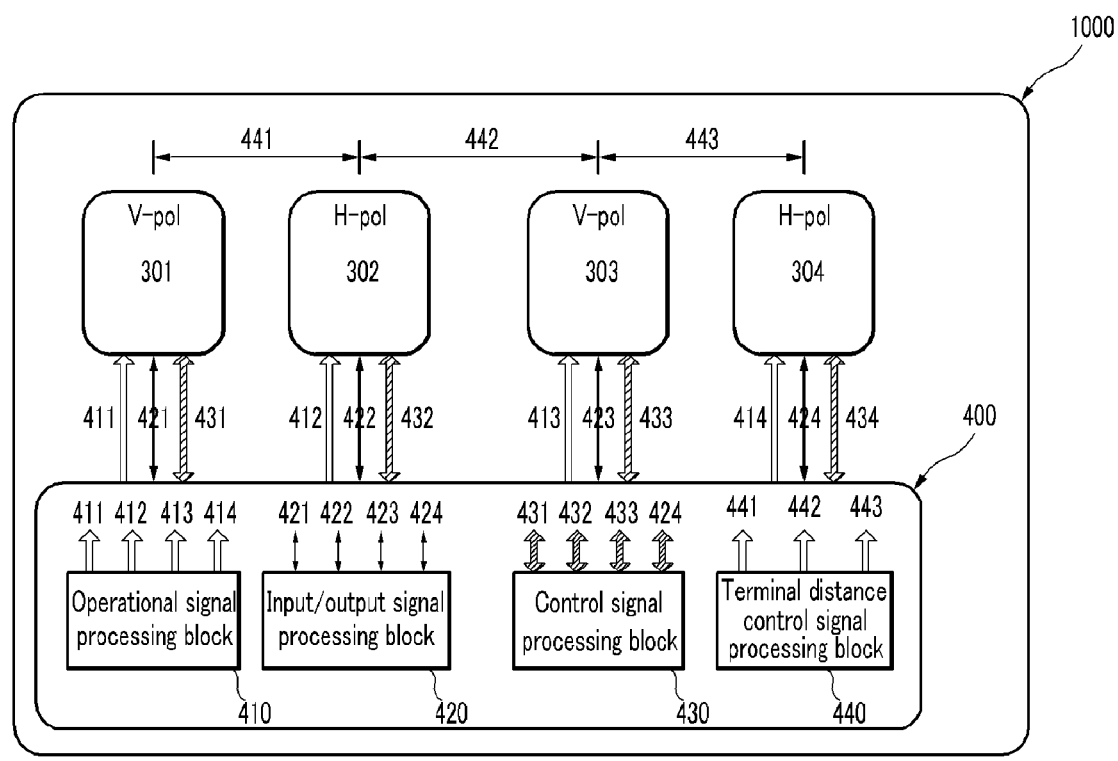
FIG. 7 is a diagram representing a configuration of a MIMO antenna according to the exemplary embodiment of the present invention.

FIG. 7 is a diagram representing a configuration of the MIMO antenna according to the exemplary embodiment of the present invention. In FIG. 7, it is illustrated that a MIMO antenna 1000 includes four array antennas.

As shown in FIG. 7, the MIMO antenna 1000 according to the exemplary embodiment of the present invention includes a plurality of array antennas 301 to 304, and an indoor supporting system 400.

Since the first array antenna 301, the second array antenna 302, the third array antenna 303, and the fourth array antenna 304 independently operate according to different control signals applied from the indoor supporting system, the MIMO antenna may be formed.

That is, the first array antenna 301 operates according to an AA_RSD signal 411, an AA_RF I/O signal 421, and an AA_DC&RCD signal 431 applied from the indoor supporting system 400, and it operates independently from the array antennas 302, 303, and 304. In a like manner, the second array antenna 302 receives an AA_RSD signal 412, an AA_RF I/O signal 422, and an AA_DC&RCD signal 432 from the indoor supporting system 400, the third array antenna 303 receives an AA_RSD signal 413, an AA_RF I/O signal 423, and an AA_DC&RCD signal 433 from the indoor supporting system 400, and the fourth array antenna 304 receives an AA_RSD signal 414, an AA_RF I/O signal 424, and AA_DC&RCD signal 431 from the indoor supporting system 400. Therefore, the respective array antennas independently operate according to the control signals applied from the indoor supporting system 400.

The array antennas 301, 302, 303, and 304 are the same as described in FIG. 6, and therefore descriptions of parts having been described will be omitted. In FIG. 7, while it is illustrated that the plurality of array antennas 301 to 304 are arranged in one horizontal column, it is not limited thereto, and the plurality of array antennas 301 to 304 may be arranged in one vertical column or in two dimensions according to a design condition.

The indoor supporting system 400 includes an operational signal processing block 410, an input/output signal processing block 420, a terminal distance control signal processing block 440, and a control signal processing block 430.

The operational signal processing block 410 applies respective AA_RSD signals 411, 412, 413, and 414 to the array antennas 301, 302, 303, and 304. In this case, the AA_RSD signals 411, 412, 413, and 414 reconfigure the distance between the neighboring cross dipole modules to reduce the correlation between the signals generated by the plurality of cross dipole modules formed in the array antenna.

The input/output signal processing block 420 controls a MIMO RF or intermediate frequency (IF) and a baseband. That is, the input/output signal processing block 420 processes the AA_RF I/O signals 421, 422, 423, and 424 of the array antennas 301, 302, 303, and 304. Here, the AA_RF I/O signals 421, 422, 423, and 424 are input/output from/to the array antenna.

The control signal processing block 430 applies the AA_DC&RSD signals 431, 432, 433, and 434 to the respective array antennas 301, 302, 303, and 304. Here, the AA_DC&RSD signals 431, 432, 433, and 434 are the DC power source and the controls signals required for the feeder unit, the array controller, the driver, and the plurality of cross dipole modules in the array antenna.

In addition, the control signal processing block 430 allows the respective array antennas 301, 302, 303, and 304 to generate different polarizations to reduce the correlation between the transmitted or received signals through the neighboring array antennas 301, 302, 303, and 304. For example, as shown in FIG. 7, the first array antenna 301 and the third array antenna 303 form a beam having a cross section that is perpendicular to the ground surface, the second array antenna 302 and the fourth array antenna 304 form a beam having a cross section that is parallel to the ground surface, and the polarizations of the signals generated by the neighboring array antennas are orthogonal to each other.

The terminal distance control signal processing block 440 generates control signals 441, 442, and 443 for physically controlling a distance between the first array antenna 301 and the second array antenna 302, a distance between the second array antenna 302 and the third array antenna 303, and a distance between the third array antenna 303 and the fourth array antenna 304. That is, to reduce the correlation between the signals transmitted or received from or to the array antennas 301, 302, 303, and 304, the distance between the neighboring array antennas is readjusted according to the frequency band of the signals transmitted or received from or to the array antennas 301, 302, 303, and 304.

As described, according to the exemplary embodiment of the present invention, multiple input and multiple output functions may be performed since the MIMO antenna independently operates the plurality of array antennas for reconfiguring the frequency band, and the data transmission efficiency may be improved since the distance between the neighboring array antennas may be readjusted and the correlation between the signals transmitted/received from/to the neighboring array antennas may be optimized.

The exemplary embodiment of the present invention that has been described above may be implemented by not only an apparatus and a method but also by a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cross dipole comprising:
   a first dipole element comprising a first dipole arranged in a first direction and a second dipole arranged in a second direction crossing the first direction, and corresponding to a first frequency band;
   first and second feed points for applying a signal to the first dipole;
   third and fourth feed points for applying a signal to the second dipole;
   a second dipole element comprising a third dipole arranged in the first direction and connected to the first and second feed points through the first dipole, and a fourth dipole arranged in the second direction and connected to the third and fourth feed points through the second dipole; and
   a first switch formed between the first dipole element and the second dipole element and selectively conducting by an external control signal,
   wherein the second dipole element corresponds to a second frequency band that is lower than the first frequency band.

2. The cross dipole of claim 1, wherein the cross dipole operates at the first frequency band by the first dipole element when the first switch is turned off, and the cross dipole operates at the second frequency band by the first dipole element and the second dipole element when the first switch is turned on.

3. The cross dipole of claim 1, wherein the first switch is respectively formed between the first dipole and the third dipole and between the second dipole and the fourth dipole.

4. The cross dipole of claim 1, further comprising:
   a third dipole element comprising a fifth dipole arranged in the first direction and connected to the first and second feed points through the first dipole and the third dipole, and a sixth dipole arranged in the second direction and connected to the third and fourth feed points through the second dipole and the fourth dipole; and
   a second switch formed between the second dipole element and the third dipole element and selectively conducting by the external control signal,
   wherein the third dipole element corresponds to a third frequency band that is lower than the second frequency band.

5. The cross dipole of claim 4, which operates at the first frequency band by the first dipole element when the first and second switches are turned off, which operates at the second frequency band by the first and second dipole elements when the first switch is turned on and the second switch is turned off, and which operates at the third frequency band by the first, second, and third dipole elements when the first and second switches are turned on.

6. The cross dipole of claim 5, wherein the first switch is respectively formed between the first dipole and the third dipole and between the second dipole and the fourth dipole, and the second switch is respectively formed between the third dipole and the fifth dipole and between the fourth dipole and the sixth dipole.

7. The cross dipole of claim 1, wherein signals of opposite phases are applied to the first feed point and the second feed point, and signals of opposite phases are applied to the third feed point and the fourth feed point.

8. The cross dipole of claim 1, wherein an excitation direction of the plurality of dipoles arranged in the first direction is determined according to phases of the signals applied to the first feed point and the second feed point, an excitation direction of the plurality of dipoles arranged in the second direction is determined according to the phase of the signals applied to the third feed point and the fourth feed point, and a polarization direction is determined by a vector addition of the excitation direction of the plurality of dipoles arranged in the first direction and the excitation direction of the plurality of dipoles arranged in the second direction.

9. A cross dipole module comprising a cross dipole for reconfiguring a plurality of frequency bands according to an external control signal and generating polarization,
   wherein the cross dipole comprises:
   a first dipole element comprising a first dipole arranged in a first direction and a second dipole arranged in a second direction crossing the first direction, and corresponding to a first frequency band;
   first and second feed points for applying a signal to the first dipole;
   third and fourth feed points for applying a signal to the second dipole;
   a second dipole element comprising a third dipole connected to the first and second feed points through the first dipole and a fourth dipole connected to the third and fourth feed points through the second dipole, and corresponding to a second frequency band that is lower than the first frequency band; and
   a first switch formed between the first dipole element and the second dipole element and selectively conducting by an external control signal.

10. The cross dipole module of claim 9, wherein the cross dipole comprises:
    a third dipole element comprising a fifth dipole connected to the first and second feed points through the first dipole and the third dipole and a sixth dipole connected to the third and fourth feed points through the second dipole and the fourth dipole, and corresponding to a third frequency band that is lower than the second frequency band; and
    a second switch formed between the second dipole element and the third dipole element and selectively conducting by the external control signal.

11. The cross dipole module of claim 10, which operates at the first frequency band by the first dipole element when the first and second switches are turned off, which operates at the second frequency band by the first and second dipole elements when the first switch is turned on and the second switch is turned off, and which operates at the third frequency band by the first, second, and third dipole elements when the first and second switches are turned on.

12. The cross dipole module of claim 9, further comprising:
    a first balun circuit for respectively applying signals of opposite phases to the first feed point and the second feed point;
    a second balun circuit for respectively applying signals of opposite phases to the third feed point and the fourth feed point;
    a phase shifter for respectively applying signals having a predetermined phase difference to the first balun circuit and the second balun circuit according to the external control signal;
    a multiplexer for selecting a frequency band reconfigured according to the external control signal;
    The amplifier amplifies a signal to be input from/to the cross dipole; and a controller for controlling the first and second balun circuits, the phase shifter, the multiplexer, and the amplifier according to the external control signal.

13. An array antenna comprising a plurality of cross dipole modules respectively comprising a cross dipole for reconfiguring a plurality of frequency bands, wherein the cross dipole comprises:
a first dipole element comprising a first dipole arranged in a first direction and a second dipole arranged in a second direction crossing the first direction, and corresponding to a first frequency band;
first and second feed points for applying a signal to the first dipole;
third and fourth feed points for applying a signal to the second dipole;
a second dipole element comprising a third dipole connected to the first and second feed points through the first dipole and a fourth dipole connected to the third and fourth feed points through the second dipole, and corresponding to a second frequency band that is lower than the first frequency band; and
a first switch formed between the first dipole element and the second dipole element and selectively conducting by an external control signal.

14. The array antenna of claim 13, wherein the cross dipole comprises:
a third dipole element comprising a fifth dipole connected to the first and second feed points through the first dipole and the third dipole and a sixth dipole that is arranged in the second direction and is connected to the third and fourth feed points through the second dipole and the fourth dipole, and corresponding to a third frequency band that is lower than the second frequency band; and
a second switch formed between the first dipole element and the second dipole element and selectively conducting by a frequency band at which the cross dipole operates.

15. The array antenna of claim 14, wherein the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on.

16. The cross dipole module of claim 13, further comprising:
a feeder unit for combining or separating signals input/output through the plurality of cross dipole modules;
a driver for readjusting a distance between neighboring cross dipole modules according to a frequency band at which the plurality of cross dipole modules operate; and
a controller for applying a signal for controlling input/output signals of the cross dipole and a DC power source to the plurality of cross dipole modules.

17. A multiple input multiple output antenna comprising:
a plurality of array antennas for inputting/outputting a frequency band or signals having different polarization directions; and
an indoor supporting system for generating a signal for controlling the plurality of array antennas,
wherein the array antenna comprises a plurality of cross dipole module that are simultaneously controlled,
the cross dipole module comprises a cross dipole for reconfiguring the plurality of frequency bands and reconfiguring the polarization direction, and
the cross dipole comprises
a first dipole element comprising a first dipole arranged in a first direction and a second dipole arranged in a second direction crossing the first direction, and corresponding to a first frequency band,
first and second feed points for applying a signal to the first dipole,
third and fourth feed points for applying a signal to the second dipole,
a second dipole element comprising a third dipole connected to the first and second feed points through the first dipole and a fourth dipole connected to the third and fourth feed points through the second dipole, and corresponding to a second frequency band that is lower than the first frequency band, and
a first switch formed between the first dipole element and the second dipole element and selectively conducting according to a frequency band at which the cross dipole operates.

18. The multiple input multiple output antenna of claim 17, wherein the cross dipole comprises:
a third dipole element comprising a fifth dipole connected to the first and second feed points through the first dipole and the third dipole and a sixth dipole connected to the third and fourth feed points through the second dipole and the fourth dipole, and corresponding to a third frequency band that is lower than the second frequency band; and
a second switch formed between the second dipole element and the third dipole element and selectively conducting according to a frequency band at which the cross dipole operates.

19. The multiple input multiple output antenna of claim 18, wherein the cross dipole operates at the first frequency band by the first dipole element when the first and second switches are turned off, the cross dipole operates at the second frequency band by the first and second dipole elements when the first switch is turned on and the second switch is turned off, and the cross dipole operates at the third frequency band by the first, second, and third dipole elements when the first and second switches are turned on.

20. The multiple input multiple output antenna of claim 17, wherein, in the cross dipole, an excitation direction of the plurality of dipoles arranged in the first direction is determined according to phases of the signals applied to the first feed point and the second feed point, an excitation direction of the plurality of dipoles arranged in the second direction is determined according to the phase of the signals applied to the third feed point and the fourth feed point, and a polarization direction is determined by a vector addition of the excitation direction of the plurality of dipoles arranged in the first direction and the excitation direction of the plurality of dipoles arranged in the second direction.

21. The multiple input multiple output antenna of claim 17, wherein the indoor supporting system comprises:
an operational signal processing block for physically reconfiguring a distance between neighboring cross dipole modules according to the frequency band reconfigured by the plurality of cross dipole modules formed in the array antenna;
an input/output signal processing block for processing signals input/output through the plurality of array antennas;
a terminal distance control signal processing block for readjusting a distance between the neighboring array antennas according to a frequency band of the signal input/output through each array antenna in the plurality of array antennas; and a control signal processing block for applying a control signal for reconfiguring the frequency band of the signal to be input/output through the plurality of array antennas and designating a type of signal to be generated by the plurality of array antennas and a DC power source required in the plurality of array antennas to the array antenna.

22. The multiple input multiple output antenna of claim 21, wherein the array antenna comprises:

a feeder unit for combining signals generated by controlling the plurality of cross dipole modules to apply the combined signal to the input/output signal processing block or separating the signal applied from the input/output signal processing block to respectively apply them to the plurality of cross dipole modules;

a driver for readjusting a distance between the neighboring cross dipole modules according to the control signal applied from the operational signal processing block; and a controller for equally applying the control signal and the DC power source that are applied from the control signal processing block to the plurality of cross dipole modules.

23. The multiple input multiple output antenna of claim 22, wherein the cross dipole module comprises:

a first balun circuit for respectively applying signals of opposite phases to the first feed point and the second feed point;

a second balun circuit for respectively applying signals of opposite phases to the third feed point and the fourth feed point;

a phase shifter for respectively applying an input current having a predetermined phase difference to the first balun circuit and the second balun circuit according to the control signal applied from the control signal processing block;

a multiplexer for selecting a frequency band reconfigured according to the control signal applied from the control signal processing block; and an amplifier for amplifying the input/output signals of the cross dipole.

* * * * *